United States Patent
Grein et al.

(10) Patent No.: US 9,701,826 B2
(45) Date of Patent: Jul. 11, 2017

(54) LOW FILLED POLYPROPYLENE COMPOSITION WITH BALANCED PROPERTY PROFILE

(75) Inventors: Christelle Grein, Linz (AT); Cornelia Tranninger, Pucking (AT); Georg Grestenberger, St. Peter in der Au (AT); Michael Tranninger, Pucking (AT)

(73) Assignee: Borealis AG (AT)

( * ) Notice: Subject to any disclaimer, the term of this patent is extended or adjusted under 35 U.S.C. 154(b) by 72 days.

(21) Appl. No.: 14/240,260

(22) PCT Filed: Aug. 22, 2012

(86) PCT No.: PCT/EP2012/066310
§ 371 (c)(1),
(2), (4) Date: Mar. 12, 2014

(87) PCT Pub. No.: WO2013/026864
PCT Pub. Date: Feb. 28, 2013

(65) Prior Publication Data
US 2014/0187708 A1    Jul. 3, 2014

(30) Foreign Application Priority Data
Aug. 25, 2011  (EP) .................................. 11178836

(51) Int. Cl.
C08L 23/14  (2006.01)
C08L 23/10  (2006.01)

(52) U.S. Cl.
CPC ............... *C08L 23/14* (2013.01); *C08L 23/10* (2013.01)

(58) Field of Classification Search
CPC ........................................................ C08L 23/14
See application file for complete search history.

(56) References Cited

U.S. PATENT DOCUMENTS

| | | | |
|---|---|---|---|
| 2002/0151653 A1 | 10/2002 | Jeong | |
| 2004/0014891 A1* | 1/2004 | Krabbenborg | C08F 8/34 525/191 |
| 2011/0129627 A1* | 6/2011 | Schedenig | C08L 23/10 428/35.7 |

FOREIGN PATENT DOCUMENTS

| | | |
|---|---|---|
| WO | 9821275 A1 | 5/1998 |
| WO | 99/24478 A1 | 5/1999 |
| WO | 99/24479 A1 | 5/1999 |
| WO | 00/68315 A1 | 11/2000 |
| WO | 2010006999 A1 | 1/2010 |
| WO | 2010115878 A1 | 10/2010 |

(Continued)

OTHER PUBLICATIONS

First Chinese Office Action dated Mar. 31, 2015.
(Continued)

*Primary Examiner* — Lanee Reuther
(74) *Attorney, Agent, or Firm* — Tarolli, Sundheim, Covell & Tummino LLP

(57) ABSTRACT

The present invention relates to a polyolefin composition comprising (a) a heterophasic propylene copolymer, wherein the xylene cold soluble fraction of the heterophasic propylene copolymer has an intrinsic viscosity of lower than 2.0 dl/g, (b) a high density polyethylene having a density of at least 940 kg/m$^3$, (c) a linear low density polyethylene, and (d) an inorganic filler, wherein the polyolefin composition has a MFR$_2$ (230° C.) of at least 20 g/10 min.

12 Claims, 1 Drawing Sheet

Measurement setup

(56) References Cited

FOREIGN PATENT DOCUMENTS

| WO | 2010/149529 A1 | 12/2010 | |
|---|---|---|---|
| WO | 2013/010879 A1 | 1/2013 | |
| WO | WO 2013010879 A1 * | 1/2013 | .............. C08L 23/10 |

OTHER PUBLICATIONS

First Chinese Search Report, Mar. 17, 2015.
European Office Action for Application No.: 12 748 505.0—1301, dated Apr. 17, 2015.
Sybille Frank, et al., New Measurement Method for Appearance of Flow Marks or Tiger Stripes Defect for Improved Quantification and Analysis, PPS 25 Intern. Conf. Polym. Proc. Soc. 2009 or Proceedings of the SPIE, vol. 6831, pp. 68130T-68130T-8, (2008).

* cited by examiner

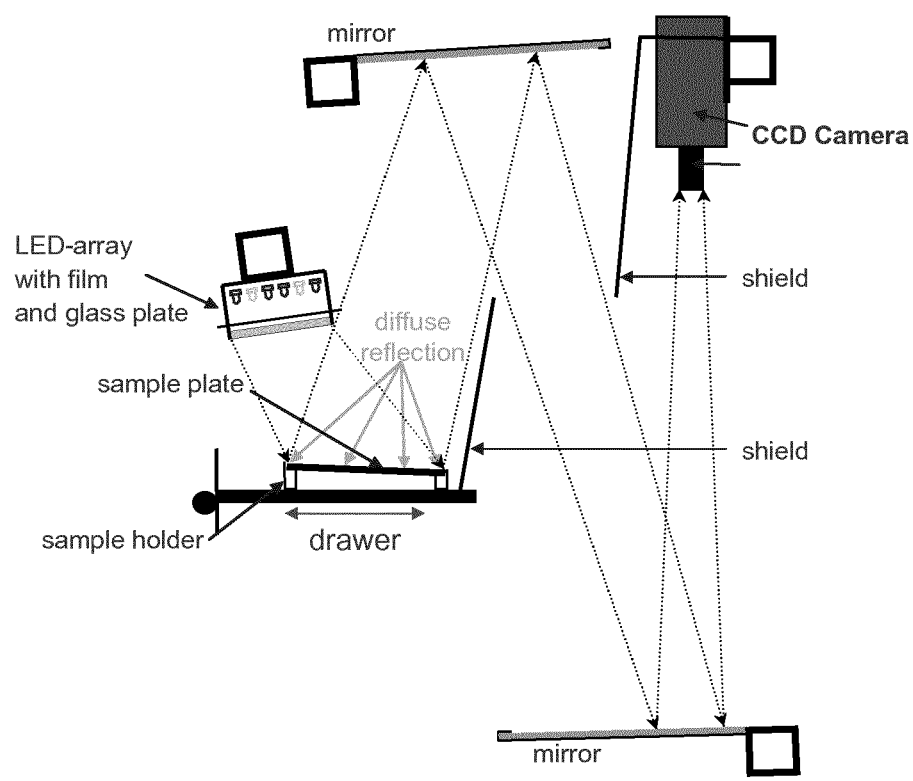
Measurement setup

LOW FILLED POLYPROPYLENE COMPOSITION WITH BALANCED PROPERTY PROFILE

The present invention relates to a new polyolefin composition comprising a heterophasic propylene copolymer (HECO), a high density polyethylene (HDPE), a second polyethylene (PE2) having a density of below 940 kg/m$^3$, and an inorganic filler (F). The present invention also relates to an article comprising the said polyolefin composition, to a process for the preparation of the polyolefin composition and to uses thereof.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene contains a crystalline polyethylene to some extent. In the automobile industry such heterophasic polypropylene grades contain an amount of about 30 wt.-% propylene copolymer rubber, which normally is produced directly in one or two gas phase reactors or added externally to the matrix via a compounding step.

In the field of automotive exterior applications the thermal expansion of a polymer is of great importance. The coefficient of linear thermal expansion (CLTE) determines the minimum gap width between two parts. Most of the time, the parts are made from different materials. To avoid big gaps and high stresses in the parts, the coefficient of linear thermal expansion (CLTE) should be as low as possible.

The conventional way of reducing the coefficient of linear thermal expansion (CLTE) in automotive compounds is to incorporate inorganic fillers (usually at high loadings, i.e. 10 to 30 wt.-%). The reduction of thermal expansion and shrinkage via filler-addition is based on two different mechanisms that most of the time act simultaneously:

volume dilution with a material of lower shrinkage/CLTE mechanical constraint by a dispersed phase with low CLTE and high modulus. For this purpose fillers with high aspect ratios are normally used.

A disadvantage of this method is that the materials may suffer from poor toughness, bad appearance and difficulties in processing. Furthermore, the weight of these parts increases through the filler incorporation. To minimize the need for filler incorporation the polymer itself should feature a high dimensional stability. Additionally the materials should show high flowability and balanced mechanical properties, e.g. good stiffness and high ductility. A high tensile strain at break is often thought to be an indicator of ductility. Whereas low filler loadings are beneficial for a high tensile strain at break, high flowability is detrimental for this property since the strain at break is decreasing below a critical molecular weight with increasing melt flow rate due to a lower amount of entanglements in the polymer chain.

For example, materials with a rubber of low intrinsic viscosity (IV) may also show a low shrinkage or thermal expansion. However, materials with a rubber of low intrinsic viscosity (IV) also typically have a low impact strength, which is undesired especially in the automotive field. Furthermore, since automotive parts are predominantly produced by means of injection moulding, a high melt flow rate (MFR) is highly desirable in order to facilitate the manufacture of large injection moulded parts.

Thus, there remains a need in the art for a polyolefin composition having at the same time a low coefficient of linear thermal expansion (CLTE), a high impact strength, and a high melt flow rate (MFR) at preferably low filler content. The object of the present invention is to meet the above need.

Further surface defects, which are also known as flow marks, tiger stripes or flow lines, are deteriorating the surface aesthetics since they manifest, during injection moulding, as a series of alternating high and low gloss strips perpendicular to the direction of the melt flow. Accordingly it is envisaged to find a polyolefin composition which does not show at all or only minor flow marks.

The present inventors have surprisingly found that a polyolefin composition having a melt flow rate MFR$_2$ (230° C.) of at least 20 g/10 min and comprising a heterophasic propylene copolymer (HECO), wherein the xylene cold soluble fraction (XCS) of the heterophasic propylene copolymer (HECO) has an intrinsic viscosity of lower than 2.0 dl/g, and further comprising a high density polyethylene, a second polyethylene different to the high density polyethylene and an inorganic filler, can solve the above addressed problems.

Thus, the present invention relates in a first aspect to a polyolefin composition (PO) comprising
(a) a heterophasic propylene copolymer (HECO) comprising
   (a1) a polypropylene (PP), and
   (a2) an elastomeric propylene copolymer (E),
   wherein the xylene cold soluble (XCS) fraction of the heterophasic propylene copolymer (HECO) has an intrinsic viscosity of lower than 2.0 dl/g,
(b) a high density polyethylene (HDPE) having a density of at least 940 kg/m$^3$,
(c) a second polyethylene (PE2) having a density of below 940 kg/m$^3$, and
(d) an inorganic filler (F),
wherein the polyolefin composition (PO) has a melt flow rate MFR$_2$ (230° C.) of at least 20 g/10 min.

The present invention also relates to an article, preferably an automotive article, comprising the above polyolefin composition (PO).

The present invention further relates to a process for the preparation of the above polyolefin composition (PO) by extruding the heterophasic propylene copolymer (HECO), the high density polyethylene (HDPE), the linear low density polyethylene (LLDPE), and the inorganic filler (F) in an extruder.

A further aspect of the present invention is the use of the above polyolefin composition (PO) in an automotive application.

Further preferred embodiments of the present invention are described in the appended claims.

In the following the invention will be described in more detail below.

The polyolefin composition (PO) of the present invention comprises in a preferred embodiment
(a) at least 50 wt.-%, like at least 60 wt.-%, more preferably 50 to 90 wt.-%, still more preferably 60 to 80 wt.-%, yet more preferably 65 to 75 wt.-% of the heterophasic propylene copolymer (HECO);
(b) at least 5 wt.-%, preferably 5 to 25 wt.-%, more preferably 8 to 20 wt.-%, still more preferably 9 to 17 wt.-% of the high density polyethylene (HDPE);

(c) at least 5 wt.-%, preferably 5 to 25 wt.-%, more preferably 6 to 20 wt.-%, still more preferably 7 to 15 wt.-%, yet more preferably 8 to 14 wt.-% of the second polyethylene (PE2);

(d) up to 20 wt.-%, preferably up to 10 wt.-%, more preferably 2 to 15 wt.-%, still more preferably 3 to 10 wt.-% of the inorganic filler (F), based on the total polyolefin composition (PO), preferably based on the total amount of polymers present in the polyolefin composition (PO) and the inorganic filler (F), more preferably based on the heterophasic propylene copolymer (HECO), the high density polyethylene (HDPE), the second polyethylene (PE2) and the inorganic filler (F).

In a preferred embodiment, the weight ratio of the high density polyethylene (HDPE) to the second polyethylene (PE2) [(HDPE)/(PE2)] is 2:1 to 1:4, more preferably is 1:1 to 1:3.

In a further preferred embodiment, the weight ratio of the elastomeric propylene copolymer (E) to the high density polyethylene (HDPE) [(E)/(HDPE)] is 4:1 to 1:2, more preferably is 3:1 to 1:1.

The melt flow rate $MFR_2$ (230° C.) of the total polyolefin composition (PO) preferably is at least 22 g/10 min, more preferably at least 25 g/10 min, still more preferably is in the range of 20 to 100 g/10 min, more preferably 22 to 50 g/10 min.

The polyolefin composition of the instant invention is featured by good mechanical properties. Accordingly it is preferred that the polyolefin composition (PO) has tensile modulus of at least 1,000 MPa, more preferably in the range of 1,000 to 2,200 MPa, still more preferably in the range of 1,100 to 1,700 MPa.

Further also the impact strength should be rather high. Accordingly it is appreciated that the polyolefin composition (PO) has a Charpy notched impact strength (ISO 179 1eA) at 23° C. of at least 18 $kJ/m^2$, more preferably of at least 20 $kJ/m^2$, yet more preferably in the range of 20 to 70 $kJ/m^2$, still more preferably in the range of 28 to 60 $kJ/m^2$, and/or has a Charpy notched impact strength (ISO 179 1eA) at −30° C. of at least 1.5 $kJ/m^2$, more preferably of at least 2.5 $kJ/m^2$, yet more preferably in the range of 2.0 to 10.0 $kJ/m^2$, still more preferably in the range of 2.5 to 8.0 $kJ/m^2$.

The elongation at break should also be high. Accordingly, it is appreciated that the polyolefin composition (PO) has an elongation at break of at least 200%, preferably at least 220%, more preferably in the range of 200 to 450%, like in the range of 220 to 400%.

Furthermore, the polyolefin composition (PO) of the present invention preferably shows a low coefficient of linear thermal expansion (CLTE). It is preferred that the polyolefin composition (PO) has a coefficient of linear thermal expansion (CLTE) performed in a temperature range from −30 to +80° C. of not more than 100 μm/mK, more preferably of not more than 90 μm/mK, still more preferably in the range of 60 to 90 μm/mK, yet more preferably in the range of 65 to 85 μm/mK. These values are in particular applicable in case the polyolefin composition (PO) comprises not more than 8 wt.-%, i.e. not more than 7 wt.-% inorganic filler (F), the weight percentage is measured on the total polyolefin composition (PO).

Furthermore, the polyolefin composition (PO) of the present invention preferably shows a low radial shrinkage. For example, the polyolefin composition (PO) has a radial shrinkage of 2.0% or lower, more preferably of 1.5% or lower, even more preferably in the range of 0.2 to 1.5%, still more preferably in the range of 0.25 to 1.1%.

Furthermore, the polyolefin composition (PO) of the present invention preferably shows a very low difference in radial and tangential shrinkage. For example, the polyolefin composition (PO) has difference in radial to tangential shrinkage of equal or below 0.1%, like in the range of 0.01 to 0.1%, the percentage is determined by the formula $$ST-SR$$

wherein
ST is the tangential shrinkage [%].
SR is the radial shrinkage [%]

The polyolefin composition (PO) in accordance with the present invention may be prepared by compounding the components within suitable melt mixing devices for preparing polymeric compounds, including in particular extruders, like single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C.

In the following the individual components are defined in more detail.

Heterophasic Propylene Copolymer

The expression "heterophasic" as used in the instant invention indicates that the elastomeric propylene copolymer (E) is (finely) dispersed in the polypropylene (PP). In other words the polypropylene (PP) constitutes a matrix in which the elastomeric propylene copolymer (E) forms inclusions in the matrix, i.e. in the polypropylene (PP). Thus the matrix contains (finely) dispersed inclusions being not part of the matrix and said inclusions contain the elastomeric propylene copolymer (E). The term "inclusion" according to this invention shall preferably indicate that the matrix and the inclusion form different phases within the heterophasic system, said inclusions are for instance visible by high resolution microscopy, like electron microscopy or scanning force microscopy.

Further it is preferred that the heterophasic propylene copolymer (HECO) before mixed with the other components mentioned herein comprises as polymer components only the polypropylene (PP) and the elastomeric propylene copolymer (E). In other words the heterophasic propylene copolymer (HECO) may contain further additives but no other polymer in an amount exceeding 7.5 wt-%, more preferably exceeding 5 wt.-%, based on the total heterophasic propylene copolymer (HECO), more preferably based on the polymers present in the propylene copolymer (HECO). One additional polymer which may be present in such low amounts is a polyethylene which is a reaction product obtained by the preparation of the heterophasic propylene copolymer (HECO). Accordingly it is in particular appreciated that a heterophasic propylene copolymer (HECO) as defined in the instant invention contains only a polypropylene (PP), an elastomeric propylene copolymer (E) and optionally a polyethylene in amounts as mentioned in this paragraph.

Also the polyolefin composition (PO) of the present invention can be regarded as a heterophasic system. Accordingly the polypropylene (PP) of the heterophasic propylene copolymer (HECO) constitutes also the matrix of the overall polyolefin composition (PO). The elastomeric propylene copolymer (E), the high density polyethylene (HDPE), the second polyethylene (PE2), and the inorganic filler (F) are (finely) dispersed in said matrix. Thereby the elastomeric propylene copolymer (E), the high density polyethylene (HDPE), and the second polyethylene (PE2) may form separate inclusions in the matrix, i.e. in the polypropylene (PP), or the high density polyethylene (HDPE) and the second polyethylene (PE2), respectively, may form an inclusion within the inclusion of the elastomeric propylene copolymer (E).

The heterophasic propylene copolymer (HECO) has a melt flow rate MFR$_2$ (230° C.) of at least 30 g/10 min, more preferably in the range of 30 to 300 g/10 min, still more preferably in the range of 35 to 200 g/10 min, yet more preferably in the range of 40 to 125 10 g/10 min.

Preferably it is desired that the heterophasic propylene copolymer (HECO) is thermo mechanically stable. Accordingly it is appreciated that the heterophasic propylene copolymer (HECO) has a melting temperature (T$_m$) of at least 135° C., more preferably in the range of 135 to 170° C., yet more preferably in the range of 145 to 168° C.

Preferably the propylene content in the heterophasic propylene copolymer (HECO) is 75.0 to 95.0 wt.-%, more preferably 80.0 to 90.0 wt.-%, based on the total heterophasic propylene copolymer (HECO), more preferably based on the amount of the polymer components of the heterophasic propylene copolymer (HECO), yet more preferably based on the amount of the polypropylene (PP) and the elastomeric propylene copolymer (E) together. The remaining part constitutes the comonomers as defined for the polypropylene (PP) being a random propylene copolymer (R-PP) and the elastomeric propylene copolymer (E), respectively, preferably ethylene. Accordingly the comonomer content, preferably ethylene content, is in the range of 5.0 to 25.0 wt.-%, more preferably in the range of 10.0 to 20.0 wt.-%, based on the total heterophasic propylene copolymer (HECO), more preferably based on the amount of the polymer components of the heterophasic propylene copolymer (HECO), yet more preferably based on the amount of the polypropylene (PP) and the elastomeric propylene copolymer (E) together.

In a preferred embodiment, the heterophasic propylene copolymer (HECO) has a comonomer content of 7 to 20 wt.-%, more preferably 9 to 17 wt.-%, still more preferably 10 to 15 wt.-%, based on the total weight of the heterophasic propylene copolymer (HECO). The comonomers are preferably ethylene and/or a C$_4$ to C$_{12}$ olefin, especially ethylene, based on the total heterophasic propylene copolymer (HECO), more preferably based on the amount of the polymer components of the heterophasic propylene copolymer (HECO), yet more preferably based on the amount of the polypropylene (PP) and the elastomeric propylene copolymer (E) together.

As stated above the matrix of the heterophasic propylene copolymer (HECO) is the polypropylene (PP).

The polypropylene (PP) according to this invention has preferably a melt flow rate MFR$_2$ (230° C.) of 40 to 200 g/10 min, preferably in the range of 50 to 150 g/10 min.

Accordingly it is preferred that the polypropylene (PP) has a weight average molecular weight (M$_w$) from 90,000 to 300,000 g/mol, more preferably from 100,000 to 250,000 g/mol.

A broad molecular weight distribution (MWD) improves the processability of the polypropylene. Accordingly it is appreciated that the molecular weight distribution (MWD) of the polypropylene (PP) is at least 2.8, more preferably at least 3.0, like at least 3.3 In a preferred embodiment the molecular weight distribution (MWD) is preferably between 2.8 to 10.0, still more preferably in the range of 3.0 to 8.0.

The polypropylene (PP) can be a propylene homopolymer (H-PP) or random propylene copolymer (R-PP), the latter is preferred.

Accordingly it is appreciated that the polypropylene (PP) has a comonomer content equal or below 5.0 wt.-%, more preferably equal or below 3.0 wt.-%, based on the polypropylene (PP).

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

In case the polypropylene (PP) is a random propylene copolymer (R-PP) it comprises monomers copolymerizable with propylene, for example comonomers such as ethylene and/or C$_4$ to C$_{12}$ α-olefins, in particular ethylene and/or C$_4$ to C$_{10}$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 5.0 wt.-%, still more preferably in the range of more than 0.5 to 3.0 wt.-%, based on the random propylene copolymer (R-PP).

The term "random copolymer" indicates that the comonomers within the propylene copolymer (PP) are randomly distributed. The randomness defines the amount of isolated comonomer units, i.e. those which have no neighbouring comonomer units, compared to the total amount of comonomers in the polymer chain.

The polypropylene (PP) can have a xylene cold soluble content (XCS) in the range up to 6.0 wt.-%. Accordingly the polypropylene (PP) may have a xylene cold soluble content (XCS) in the range of 0.5 to 4.5 wt.-%, based on the polypropylene (PP).

The polypropylene (PP) can be produced in different reactors and thus may comprises different fractions being different in its properties. For instance the fractions may differ in melt flow rate or comonomer content, the latter being preferred. Accordingly in one preferred embodiment the polypropylene (PP) is a random propylene copolymer (R-PP) comprising at least two fractions. More preferably the random propylene copolymer (R-PP) comprises, more preferably consists of, a first polymer fraction being either a propylene homopolymer fraction or a random propylene copolymer fraction and a second polymer fraction being a random propylene copolymer fraction. In such a case it is preferred that the weight ratio of the first fraction to the second fraction is 30:70 to 70:30. Preferably the first polymer fraction is a propylene homopolymer fraction whereas the second fraction is a propylene copolymer fraction with a comonomer content, like ethylene content, of not more than 3.0 wt.-%, more preferably in the range of 0.5 to 3.0 wt.-%, like 0.5 to 2.0 wt.-%, based on the second fraction.

One further essential component of the heterophasic propylene copolymer (HECO) is its elastomeric propylene copolymer (E).

The elastomeric propylene copolymer (E) preferably comprises monomers copolymerizable with propylene, for example comonomers such as ethylene and/or C$_4$ to C$_{12}$ α-olefins, in particular ethylene and/or C$_4$ to C$_{10}$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer phase (E) comprises units derivable from ethylene and propylene only.

In case the polypropylene (PP) is a random propylene copolymer (R-PP) it is preferred that the comonomer(s) of the random propylene copolymer (R-PP) and the elastomeric propylene copolymer (E) are the same.

The properties of the elastomeric propylene copolymer phase (E) mainly influence the xylene cold soluble (XCS) content of the heterophasic propylene copolymer (HECO). Thus according to the present invention the xylene cold soluble (XCS) fraction of heterophasic propylene copolymer (HECO) is regarded as the elastomeric propylene copolymer (E) of the heterophasic propylene copolymer (HECO). In the context of the present invention, the xylene cold soluble (XCS) fraction is also referred to as "amorphous fraction".

Accordingly, the amount of the elastomeric propylene copolymer (E), i.e. of the xylene cold soluble (XCS) fraction, of the heterophasic propylene copolymer (HECO) is preferably at least 10.0 wt.-%, more preferably is in the range of 10.0 to 35.0 wt.-%, still more preferably in the range of 12.0 to 30.0 wt.-%, yet more preferably in the range of 15.0 to 25.0 wt.-%. These values are based on the heterophasic propylene copolymer (HECO) and not on the polyolefin composition (PO).

Low intrinsic viscosity (IV) values reflect a low weight average molecular weight. Thus it is appreciated that the elastomeric propylene copolymer phase (E), i.e. the xylene cold soluble fraction (XCS) of the heterophasic propylene copolymer (HECO), has an intrinsic viscosity (IV) of lower than 2.2 dl/g, preferably of 2.0 dl/g or lower, more preferably of 1.8 or lower, such as in the range of 1.0 to lower than 2.0 dl/g, preferably in the range of equal or more than 1.2 to equal or less than 1.8 dl/g.

The comonomer content, preferably the ethylene content, within the elastomeric propylene copolymer phase (E) shall be preferably also in a specific range. Accordingly in a preferred embodiment the comonomer content, more preferably ethylene content, of the elastomeric propylene copolymer (E), i.e. of the xylene cold soluble fraction (XCS) of the heterophasic propylene copolymer (HECO), is equal or more than 30.0 wt.-%, more preferably in the range of 30.0 to 70.0 wt.-%, still more preferably in the range of 35.0 to 55.0 wt.-%, based on the xylene cold soluble fraction (XCS) of the heterophasic propylene copolymer (HECO). Accordingly it is appreciated that the propylene content of the elastomeric propylene copolymer (E), i.e. of the xylene cold soluble fraction (XCS) of the heterophasic propylene copolymer (HECO), is less than 70.0 wt.-%, more preferably in the range of 30.0 to 70.0 wt.-%, still more preferably in the range of 45.0 to 65.0 wt.-%, based on the xylene cold soluble fraction (XCS) of the heterophasic propylene copolymer (HECO).

In a preferred embodiment, the elastomeric propylene copolymer (E) is bimodal or multimodal. More particularly, the elastomeric propylene copolymer (E) preferably is bimodal or multimodal in view of the intrinsic viscosity and/or the comonomer distribution.

Accordingly the elastomeric propylene copolymer (E) may comprise at least two fractions of different comonomer content and/or of different intrinsic viscosity (IV).

Thus in a specific embodiment, elastomeric propylene copolymer (E) comprises, preferably consists of, a fraction (A) and a fraction (B), said fraction (A) has a lower comonomer content and/or a different intrinsic viscosity than fraction (B).

Fraction (A) may be an elastomeric propylene copolymer (E1) having a comonomer content, like etylene content, of 35.0 to 80.0 wt.-%, more preferably of 40.0 to 70.0 wt.-%, based on the fraction (A) and/or an intrinsic viscosity of 1.0 to 2.0 dl/g, more preferably of 1.2 to 1.8 dl/g, still more preferably of 1.2 to 1.6 dl/g. Furthermore, fraction (B) may be an elastomeric propylene copolymer (E2) having a comonomer content, like ethylene content, of 10.0 to 35.0 wt.-%, more preferably of 10.0 to 30.0 wt.-%, based on fraction (B) and/or an intrinsic viscosity of 1.2 to 2.5 dl/g, more preferably of 1.5 to 2.3 dl/g. Although the provided ranges for the comonomer content and intrinsic viscosity, respectively, for fraction (A) and (B), i.e. for the elastomeric propylene copolymer (E1) and the elastomeric propylene copolymer (E2), overlapp, this does not mean that they are identical. Accordingly it is preferred that the comonomer content, like ethylene content, of fraction (A), i.e. of elastomeric propylene copolymer (E1), is at least 5.0 wt.-% higher than of fraction (B), i.e. of elastomeric propylene copolymer (E2), and/or the intrinsic viscosity of fraction (A), i.e. of elastomeric propylene copolymer (E1), is at least 0.2 dl/g lower than the intrinsic viscosity of fraction (B), i.e. of elastomeric propylene copolymer (E2).

As will be explained below, the heterophasic polypropylene (HECO) as well their individual components (matrix and elastomeric copolymer) can be produced by blending different polymer types, i.e. of different molecular weight and/or comonomer content. However it is preferred that the heterophasic polypropylene (HECO) as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The heterophasic propylene copolymer (HECO) according to this invention is preferably produced in a sequential polymerization process, i.e. in a multistage process, known in the art, wherein the polypropylene (PP) is produced at least in one slurry reactor, preferably in a slurry reactor and optionally in a subsequent gas phase reactor, and subsequently the elastomeric propylene copolymer (E) is produced at least in one, i.e. one or two, gas phase reactor(s).

Accordingly it is preferred that the heterophasic propylene copolymer (HECO) is produced in a sequential polymerization process comprising the steps of
(a) polymerizing propylene and optionally at least one ethylene and/or $C_4$ to $C_{12}$ α-olefin in a first reactor (R1) obtaining the first polymer fraction, preferably said first polymer fraction is a propylene homopolymer,
(b) transferring the first polymer fraction into a second reactor (R2), like a gas phase reactor,
(c) polymerizing in the second reactor (R2) and in the presence of said first polymer fraction propylene and optionally at least one ethylene and/or $C_4$ to $C_{12}$ α-olefin obtaining thereby the second polymer fraction, preferably said second polymer fraction is a random propylene copolymer fraction, said first polymer fraction and said second polymer fraction form the polypropylene (PP), i.e. the matrix of the heterophasic propylene copolymer (HECO),
(d) transferring the polypropylene (PP) of step (c) into a third reactor (R3), (e) polymerizing in the third reactor (R3) and in the presence of the polypropylene (PP) obtained in step (c) propylene and at least one ethylene and/or $C_4$ to $C_{12}$ α-olefin obtaining thereby a first elastomeric propylene copolymer (E1), the first elastomeric propylene copolymer (E1) is dispersed in the polypropylene (PP), (f) transferring the polypropylene (PP) in which the first elastomeric propylene copolymer (E1) is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer (E2), the polypropylene (PP), the first elastomeric propylene copolymer (E1), and the second elastomeric propylene copolymer (E2) form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a transesterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

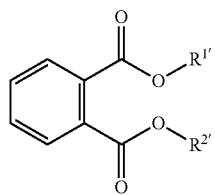

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

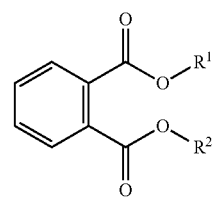

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

Most preferably the external donor is of formula (IIIa), like dicyclopentyl dimethoxy silane [$Si(OCH_3)_2(cyclo-pentyl)_2$] or diisopropyl dimethoxy silane [$Si(OCH_3)_2(CH(CH_3)_2)_2$].

In a further embodiment, the Ziegler-Natta procatalyst can be modified by polymerizing a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH—CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the heterophasic propylene copolymer (HECO) is α-nucleated. In case the α-nucleation is not effected by a vinylcycloalkane polymer or a vinylalkane polymer as indicated above, the following α-nucleating agents (N) may be present
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl)phosphate or aluminium-hydroxy-bis[2,2'-methylene-bis(4,6-di-t-butylphenyl)phosphate], and
(iv) mixtures thereof.

High Density Polyethylene (HDPE)

The polyolefin composition according to the present invention further comprises a high density polyethylene (HDPE). The high density polyethylene (HDPE) used according to the invention is well known in the art and commercially available.

The a high density polyethylene (HDPE) preferably has a melt flow rate $MFR_2$ (190° C.) of 0.4 to 4.0 g/10 min, preferably 0.5 to 2.0 g/10 min, more preferably of 0.6 to 1.5 g/10 min, like 0.7 to 1.4 g/10 min.

The high density polyethylene (HDPE) typically has a density of at least 940 kg/m³, preferably of at least 945 kg/m³, more preferably at least 955 kg/m³, still more preferably in the range of 945 to 970 kg/m³, yet more preferably in the range of 950 to 965 kg/m³.

As mentioned above, the high density polyethylene (HDPE) is also dispersed in the matrix, i.e. in the polypropylene (PP), of the heterophasic propylene copolymer (HECO) and thus forming the overall polyolefin composition (PO).

Second Polyethylene (PE2)

As mentioned above, the instant polyolefin composition (PO) comprises further a second polyethylene (PE2). The second polyethylene (PE2) used according to the invention is well known in the art and commercially available.

The second polyethylene (PE2) has a lower density than the high density polyethylene (HDPE).

Accordingly, the second polyethylene (PE2) is a polyethylene with a low density, i.e. preferably having a density of below 940 kg/m³, more preferably 920 kg/m³ or lower, yet more preferably in the range of 800 to 915 kg/m³, still more preferably in the range of 840 to 910 kg/m³. In some embodiments, the second polyethylene (PE2) is a low density polyethylene and/or a linear low density polyethylene (LLDPE). Preferably the second polyethylene (PE2) is a linear low density polyethylene (LLDPE).

A low density polyethylene (LDPE) according to this invention preferably has a density of 900 to below 940 kg/m³, more preferably of 910 to below 940 kg/m³, like 910 to 935 kg/m³.

On the other hand the linear low density polyethylene (LLDPE) according to this invention has a density of below 900 kg/m³, more preferably of 800 to below 900 kg/m³, yet more preferably of 820 to below 900 kg/m³, still yet more preferably 820 to below 890 kg/m³.

In a preferred embodiment, the second polyethylene (PE2), i.e. the linear low density polyethylene (LLDPE), has a melt flow rate $MFR_2$ (190° C.) in the range of 0.5 to 30 g/10 min, more preferably in the range of 0.5 to below 15 g/10 min, yet more preferably in the range of 1 to 10 g/10 min.

In case the second polyethylene (PE2) is a low density polyethylene (LDPE) it can be an ethylene homopolymer or an ethylene copolymer, the latter being preferred. Accordingly the ethylene content in the low density polyethylene (LDPE) is at least 80 wt.-%, more preferably at least 90 wt.-%, based on the low density polyethylene (LDPE).

The expression ethylene homopolymer used in the instant invention relates to a polyethylene that consists substantially, i.e. of more than 99.7 wt.-%, still more preferably of at least 99.8 wt.-%, of ethylene units. In a preferred embodiment only ethylene units in the ethylene homopolymer are detectable.

In case the second polyethylene (PE2) is a linear low density polyethylene (LLDPE) it is preferably an ethylene copolymer that contains as a major part units derivable from ethylene. Accordingly it is appreciated that the linear low density polyethylene (LLDPE) comprises at least 55 wt.-% units derivable from ethylene, more preferably at least 60 wt.-% of units derived from ethylene, based on the linear low density polyethylene (LLDPE). Thus it is appreciated that the linear low density polyethylene (LLDPE) comprises units derivable from ethylene in the range of 60 to 99.5 wt.-%, more preferably in the range of 60 to 80 wt.-%, on linear low density polyethylene (LLDPE). The comonomers present in such a second polyethylene (PE2), i.e. the linear low density polyethylene (LLDPE), are $C_4$ to $C_{20}$ α-olefins, like 1-butene, 1-hexene and 1-octene, the latter especially preferred, or dienes, preferably non-conjugated α,ω-alkadienes, i.e. $C_5$ to $C_{20}$ α,ω-alkadienes, like 1,7-octadiene. Accordingly in one specific embodiment the second polyethylene (PE2), i.e. the linear low density polyethylene (LLDPE), being an ethylene copolymer is an ethylene-1,7-octadiene polymer with the amounts given in this paragraph.

The second polyethylene (PE2) preferably is also dispersed in the matrix, i.e. in the polypropylene (PP), of the heterophasic propylene copolymer (HECO) and thus forming the overall polyolefin composition (PO).

Inorganic Filler

In addition to the polymer components the polyolefin composition (PO) comprises an inorganic filler (F) in amounts of up to 20 wt.-%, preferably in an amount of up to 10 wt.-%, more preferably in the range of 4 to 15 wt.-%, still more preferably 5 to 10 wt.-%. Preferably the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

The mineral filler (F) preferably has a cutoff particle size d95 [mass percent] of equal or below 20 μm, more preferably in the range of 2.5 to 10 μm, like in the range of 2.5 to 8.0 μm.

Typically the inorganic filler (F) has a surface area measured according to the commonly known BET method with $N_2$ gas as analysis adsorptive of less than 22 $m^2/g$, more preferably of less than 20 $m^2/g$, yet more preferably of less than 18 $m^2/g$. Inorganic fillers (F) fulfilling these requirements are preferably anisotropic mineral fillers (F), like talc, mica and wollastonite.

Further Components

The instant polyolefin composition (PO) may comprise typical additives, like acid scavengers (AS), antioxidants (AO), nucleating agents (NA), hindered amine light stabilizers (HALS), slip agents (SA), and pigments. Preferably the amount of additives excluding the inorganic filler (F) shall not exceed 7 wt.-%, more preferably shall not exceed 5 wt.-%, like not more than 3 wt.-%, within the instant polyolefin composition (PO).

Articles Made from the Polyolefin Composition (PO)

The polyolefin composition (PO) of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like, especially bumpers.

The current invention also provides (automotive) articles, like injection molded articles, comprising at least to 60 wt.-%, more preferably at least 80 wt.-%, yet more preferably at least 95 wt.-%, like consisting, of the inventive polyolefin composition (PO). Accordingly the present invention is especially directed to automotive articles, especially to car interiors and exteriors, like bumpers, side trims, step assists, body panels, spoilers, dashboards, interior trims and the like, in particular bumpers, comprising at least to 60 wt.-%, more preferably at least 80 wt.-%, yet more preferably at least 95 wt.-%, like consisting, of the inventive polyolefin composition (PO).

Uses According to the Invention

The present invention also relates to the use of the polyolefin composition (PO) as described above in an automotive application. In a preferred embodiment, the polyolefin composition (PO) is used in a bumper.

The present invention will now be described in further detail by the examples provided below.

EXAMPLES

The following definitions of terms and determination methods apply for the above general description of the invention as well as to the below examples unless otherwise defined.

1. Definitions/Measuring Methods

The following definitions of terms and determination methods apply for the above general description of the invention as well as to the below examples unless otherwise defined.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Density is measured according to ISO 1183-1—method A (2004). Sample preparation is done by compression moulding in accordance with ISO 1872-2:2007.

$MFR_2$ (230° C.) is measured according to ISO 1133 (230° C., 2.16 kg load).

Calculation of melt flow rate MFR$_2$ (230° C.) of the polymer produced in the GPR 1:

$$MFR(P2) = 10^{\left[\frac{\log(MFR(P))-w(P1)\times\log(MFR(P1))}{w(P2)}\right]}$$

wherein
w(P1) is the weight fraction [in wt.-%] of the polymer produced in the loop reactor,
w(P2) is the weight fraction [in wt.-%] of the polymer produced in the GPR 1,
MFR(P1) is the melt flow rate MFR$_2$ (230° C.) [in g/10 min] of the polymer produced in the loop reactor,
MFR(P) is the total melt flow rate MFR$_2$ (230° C.) [in g/10 min] after GPR$_1$ but before GPR2,
MFR(P2) is the calculated melt flow rate MFR$_2$ (230° C.) [in g/10 min] of the polymer produced in the GPR 1.
MFR$_2$ (190° C.) is measured according to ISO 1133 (190° C., 2.16 kg load).

Number average molecular weight (M$_n$), weight average molecular weight (M$_w$) and molecular weight distribution (MWD) are determined by Gel Permeation Chromatography (GPC) according to the following method:
The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Quantification of Comonomer Content by FTIR Spectroscopy
The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 cm$^{-1}$. Specifically, the butene or hexene content of a polyethylene copolymer is determined using the baseline corrected peak area of the quantitative bands found at 1377-1379 cm$^{-1}$. Quantitative results are obtained based upon reference to the film thickness. Calculation of comonomer content of the polymer produced in the GPR 1:

$$\frac{C(P) - w(P1) \times C(P1)}{w(P2)} = C(P2)$$

wherein
w(P1) is the weight fraction [in wt.-%] of the polymer produced in the loop reactor,
w(P2) is the weight fraction [in wt.-%] of the polymer produced in the GPR1,
C(P1) is the comonomer content [in wt.-%] of the polymer produced in the loop reactor,
C(P) is the total comonomer content [in wt.-%] after GPR1 but before GPR2,
C(P2) is the calculated comonomer content [in wt.-%] of the polymer produced in the GPR1.

Calculation of comonomer content of the polymer produced in the GPR 2:

$$\frac{C(P) - w(P1) \times C(P1)}{w(P2)} = C(P2)$$

wherein
w(P1) is the weight fraction [in wt.-%] of the total polymer in the GPR1,
w(P2) is the weight fraction [in wt.-%] of the polymer produced in the GPR2,
C(P1) is the comonomer content [in wt.-%] in the GPR1,
C(P) is the total comonomer content [in wt.-%] after GPR2 but before GPR3,
C(P2) is the calculated comonomer content [in wt.-%] of the polymer produced in the GPR2.

Calculation of comonomer content of the polymer produced in the GPR 3:

$$\frac{C(P) - w(P1) \times C(P1)}{w(P2)} = C(P2)$$

wherein
w(P1) is the weight fraction [in wt.-%] of the total polymer in the GPR2,
w(P2) is the weight fraction [in wt.-%] of the polymer produced in the GPR3,
C(P1) is the comonomer content [in wt.-%] in the GPR2,
C(P) is the total comonomer content [in wt.-%] after GPR3,
C(P2) is the calculated comonomer content [in wt.-%] of the polymer produced in the GPR3.

The xylene cold solubles (XCS, wt.-%): Content of xylene cold solubles (XCS) is determined at 25° C. according ISO 16152; first edition; 2005 Jul. 1

Calculation of the xylene cold soluble (XCS) content of the polymer produced in the GPR 1:

$$\frac{XS(P) - w(P1) \times XS(P1)}{w(P2)} = XS(P2)$$

wherein
w(P1) is the weight fraction [in wt.-%] of the polymer produced in the loop reactor,
w(P2) is the weight fraction [in wt.-%] of the polymer produced in the GPR1,
XS(P1) is the xylene cold soluble (XCS) content [in wt.-%] of the polymer produced in the loop reactor,
XS(P) is the total xylene cold soluble (XCS) content [in wt.-%] after GPR1 but before GPR2,
XS(P2) is the calculated xylene cold soluble (XCS) content [in wt.-%] of the polymer produced in the GPR1.

Calculation of the xylene cold soluble (XCS) content of the polymer produced in the GPR 2:

$$\frac{XS(P) - w(P1) \times XS(P1)}{w(P2)} = XS(P2)$$

wherein w(P1) is the weight fraction [in wt.-%] of the total polymer in GPR1, w(P2) is the weight fraction [in wt.-%] of the polymer produced in the GPR2, XS(P1) is the xylene cold soluble (XCS) content [in wt.-%] of the total polymer in GPR1, XS(P) is the total xylene cold soluble (XCS) content [in wt.-%] after GPR2 but before GPR3, XS(P2) is the calculated xylene cold soluble (XCS) content [in wt.-%] of the polymer produced in the GPR2.

Calculation of the xylene cold soluble (XCS) content of the polymer produced in the GPR 3:

$$\frac{XS(P) - w(P1) \times XS(P1)}{w(P2)} = XS(P2)$$

wherein w(P1) is the weight fraction [in wt.-%] of the total polymer in GPR2, w(P2) is the weight fraction [in wt.-%] of the polymer produced in the GPR3, XS(P1) is the xylene cold soluble (XCS) content [in wt.-%] of the total polymer in GPR2, XS(P) is the total xylene cold soluble (XCS) content [in wt.-%] after GPR3, XS(P2) is the calculated xylene cold soluble (XCS) content [in wt.-%] of the polymer produced in the GPR3.

Intrinsic viscosity is measured according to DIN ISO 1628/1, October 1999 (in Decalin at 135° C.).

Calculation of the intrinsic viscosity of the polymer produced in the GPR 2:

$$IV(P2) = 10^{\left[\frac{\log(IV(P)) - w(P1) \times \log(IV(P1))}{w(P2)}\right]}$$

wherein w(P1) is the weight fraction [in wt.-%] of the total polymer in the GPR1, w(P2) is the weight fraction [in wt.-%] of the polymer produced in the GPR 2, IV(P1) is the intrinsic viscosity [in dl/g] of the total polymer in GPR1, IV(P) is the total intrinsic viscosity [in dl/g] after GPR2 but before GPR3, IV(P2) is the calculated intrinsic viscosity [in dl/g] of the polymer produced in the GPR 2.

Calculation of the intrinsic viscosity of the polymer produced in the GPR 3:

$$IV(P2) = 10^{\left[\frac{\log(IV(P)) - w(P1) \times \log(IV(P1))}{w(P2)}\right]}$$

wherein w(P1) is the weight fraction [in wt.-%] of the total polymer in GPR2, w(P2) is the weight fraction [in wt.-%] of the polymer produced in the GPR 3, IV(P1) is the intrinsic viscosity [in dl/g] of the total polymer in GPR2, IV(P) is the total intrinsic viscosity [in dl/g] after GPR3, IV(P2) is the calculated intrinsic viscosity [in dl/g] of the polymer produced in the GPR 3.

The tensile modulus, the tensile strength, the tensile stress at yield, the strain at yield and the elongation at break is measured at 23° C. according to ISO 527-1 (cross head speed 1 mm/min) using injection moulded specimens according to ISO 527-2(1B), produced according to EN ISO 1873-2 (dog 10 bone shape, 4 mm thickness).

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° C./min.

Charpy impact test: The Charpy notched impact strength (Charpy NIS) is measured according to ISO 179 1eA at 23° C., −30° C., using injection molded bar test specimens of 80×10×4 mm prepared in accordance with ISO 294-1:1996.

Cutoff particle size d95 (Sedimentation) is calculated from the particle size distribution [mass percent] as determined by gravitational liquid sedimentation according to ISO 13317-3 (Sedigraph)

Specific surface area is determined as the BET surface according to DIN 66131/2.

Shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording.

The basic principle of the measurement system is to illuminate the plates with a defined light source (LED) in a closed environment and to record an image with a CCD-camera system. A schematic setup is given in FIG. 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 210×148×3 mm³ with grain VW K50 and a filmgate of 1.4 mm were used and were produced with two different injection speeds using screw speeds of 1 mm/sec (MSE 1) and 8 mm/sec (MSE 5).

Further Conditions:

Melt temperature: 240° C.

Mould temperature 30° C.

Dynamic pressure: 10 bar hydraulic

The smaller the MSE value is at a certain injection speed, the smaller is the tendency for flow marks.

2. Examples

An experimental heterophasic propylene copolymer (HECO) was produced in a Borstar pilot plant with a prepolymerization reactor, one slurry loop reactor and three gas phase reactors using a Ziegler-Natta catalyst. The catalyst used in the polymerization process for inventive examples IE1 and IE2 was the commercial BCF20P catalyst (1.9 wt % Ti-Ziegler-Natta-catalyst as described in EP 591 224) of Borealis AG with triethyl-aluminium (TEAL) as cocatalyst and dicyclo pentyl dimethoxy silane (D-donor) as donor. The preparation of the heterophasic propylene copolymer (HECO) including the aluminium to donor ratio is described in the following table 1.

TABLE 1

Preparation of the heterophasic propylene copolymer (HECO)

| Catalyst | | |
|---|---|---|
| TEAL/Donor | [mol/mol] | 5 |
| Loop | | |
| $MFR_2$ | [g/10 min] | 68 |
| XCS | [wt %] | 2.8 |
| $C_2$ | [wt %] | 0.0 |
| $1^{st}$ GPR | | |
| $MFR_2$ | [g/10 min] | 65 |
| $MFR_2$* | [g/10 min] | 62 |
| XCS | [wt %] | 2.2 |
| XCS* | [wt %] | 1.6 |
| $C_2$ | [wt %] | 1.0 |
| $C_2$* | [wt %] | 2.0 |
| $2^{nd}$ GPR | | |
| XCS | [wt %] | 13.3 |
| $C_2$ tot | [wt %] | 10.9 |
| $C_2$ of XCS** | [wt %] | 60 |
| $C_2$ of XCS | [wt %] | 60 |
| IV of XCS** | [dl/g] | 1.4 |
| IV of XCS | [dl/g] | 1.4 |
| $3^{rd}$ GPR | | |
| $H_2/C_2$ | [mol/kmol] | 500 |
| $C_2/C_3$ | [mol/kmol] | 310 |
| $MFR_2$ | [g/10 min] | 44 |
| XCS | [wt %] | 18.7 |
| $C_2$ of XCS*** | [wt %] | 24.5 |
| $C_2$ of XCS | [wt %] | 49 |
| IV of XCS*** | [dl/g] | 2.15 |
| IV of XCS | [dl/g] | 1.6 |
| Tm | [° C.] | 162 |
| Split Loop/GPR1/GPR2/GPR3 | [wt %] | 42/42/11/5 |

*polymer produced in GPR 1
**XCS produced in GPR2, which can be equated with the polymer produced in GPR2
***XCS produced in GPR3, which can be equated with the polymer produced in GPR3

TABLE 2

Inventive and Comparative Examples

| | | Example* | | |
|---|---|---|---|---|
| | | IE 1 | IE 2 | CE 1 |
| HECO | [wt %] | 68 | 70 | |
| Talc | [wt %] | 6 | 6 | |
| HDPE | [wt %] | 15 | 10 | |
| PE2 | [wt %] | 8 | 11 | |
| MFR | [g/10 min] | 25 | 26 | 12 |
| Tensile Modulus | [MPa] | 1290 | 1190 | 1200 |
| Elongation at break | [%] | 240 | 305 | 300 |
| Impact strength +23° C. | [kJ/m²] | 30 | 42 | 35 |
| Impact strength −30° C. | [kJ/m²] | 4 | 4 | 4.5 |
| CLTE (−30/80) | [μm/mK] | 77 | 73 | 70 |
| Shrinkage radial | % | 1.08 | 1.0 | 0.95 |
| Shrinkage tangential | % | 1.1 | 1.07 | 0.90 |
| MSE 1 | [—] | | 4 | 91 |
| MSE 5 | [—] | | 3 | 11 |

Rest to 100 wt.-% are additives, like antioxidants and pigments (e.g. Carbon black)
"Talc" is the commercial talc Steamic T1 CA of Luzenac, having a cutoff particle size ($d_{95}$) of 6.2 μm.
"HDPE" is the commercial product VS5580 of Borealis AG having a $MFR_2$ (190° C./2.16 kg) of 0.95 g/10 min and a density of 958 kg/m³,
"PE2" is the commercial linear low density polyethylene (LLDPE) Engage 8200 of Dow Elastomers having a $MFR_2$ (190° C./2.16 kg) of 5.0 g/10 min, a density of 870 kg/m³.
"CE1" is the commercial product Borcom WE007AE of Borealis AG which is a polypropylene microcomposite intended for injection moulding having a mineral filler content of 4.5 wt. %.

The inventive examples IE1 and to IE2 show a high flowability, a high elongation at break, and a radial shrinkage of only about 1%. The tensile modulus is about 1200 MPa or higher and the room temperature impact strength is about 30 kJ/m² or higher. Thus this material can be used as a high flow bumper grade. Compared to the actual commercial reference CE1 it shows similar mechanical properties and dimensional stability at a double as high flowability.

The invention claimed is:
1. A polyolefin composition (PO) comprising:
   (a) a heterophasic propylene copolymer (HECO) comprising:
      (a1) a polypropylene (PP), and
      (a2) an elastomeric propylene copolymer (E),
   wherein the xylene cold soluble (XCS) fraction of the heterophasic propylene copolymer (HECO) has an intrinsic viscosity of lower than 2.0 dl/g measured according to DIN ISO 1628/1 (in Decalin at 135° C.),
   (b) a high density polyethylene (HDPE) having a density of at least 940 kg/m³ measured according to ISO 1183-1-method A,
   (c) a second polyethylene (PE2) having a density of below 940 kg/m³ measured according to ISO 1183-1-method A which is
      (i) a low density polyethylene (LDPE), or
      (ii) a linear low density polyethylene (LLDPE),
   (d) an inorganic filler (F),
   wherein the polyolefin composition (PO) has a melt flow rate $MFR_2$ (230° C.) of at least 20 g/10 min measured according to ISO 1133 (230° C., 2.16 kg load).
2. The polyolefin composition (PO) according to claim 1, wherein the heterophasic propylene copolymer (HECO):
   (a) has a melt flow rate $MFR_2$ (230° C.) in the range of 30 to 100 g/10 min measured according to ISO 1133 (230° C., 2.16 kg load), and/or
   (b) comprises the elastomeric propylene copolymer (E) in an amount of 10 to 35 wt. %, and/or
   (c) is comprised in the polyolefin composition in an amount of 50 to 90 wt. % based on the total weight of the polyolefin composition (PO), and/or

(d) has a comonomer content of 5.0 to 25.0 wt. % based on the total weight of the heterophasic propylene copolymer (HECO).

3. The polyolefin composition (PO) according to claim 1, wherein elastomeric propylene copolymer (E)
   (a) is bimodal or multimodal, and/or
   (b) has an intrinsic viscosity (IV) of lower than 2.0 dl/g, measured as the intrinsic viscosity (IV) of the xylene cold soluble (XCS) fraction of the heterophasic propylene copolymer (HECO) according to DIN ISO 1628/1 (in Decalin at 135° C.), and/or
   (c) has a comonomer content of 30 to 70 wt. % based on the total weight of the xylene cold soluble (XCS) fraction of the heterophasic propylene copolymer (HECO).

4. The polyolefin composition (PO) according to claim 1, wherein:
   (a) the weight ratio [(HDPE)/(PE2)] of the high density polyethylene (HDPE) to the second polyethylene (PE2) is 2:1 to 1:4; and/or
   (b) the weight ratio [(E)/(HDPE)] of the elastomeric propylene copolymer (E) to the high density polyethylene (HDPE) is 4:1 to 1:2; and/or
   (c) the polyolefin composition (PO) comprises the high density polyethylene (HDPE) in an amount of 5 to 25 wt. %; and/or
   (d) the polyolefin composition (PO) comprises the second polyethylene (PE2) in an amount of 5 to 25 wt. %.

5. The polyolefin composition (PO) according to claim 1, wherein the polypropylene (PP) is a random propylene copolymer (R-PP).

6. The polyolefin composition according to claim 1, wherein the polyolefin composition (PO) comprises the inorganic filler (F) in an amount of up to 20 wt. % based on the total weight of the polyolefin composition (PO).

7. The polyolefin composition (PO) according to claim 6, wherein the inorganic filler (F) has a cutoff particle size d95 [mass percent] of equal or below 20 μm measured according to 13317-3 (Sedigraph).

8. The polyolefin composition (PO) according to claim 1, wherein the high density polyethylene (HDPE) has a density of at least 945 kg/m$^3$ measured according to ISO 1183-1-method A.

9. The polyolefin composition (PO) according to claim 1, wherein the second polyethylene (PE2):
   (a) has a melt flow rate MFR$_2$ (190° C.) in the range of 0.5 to 30 g/10 min measured according to ISO 1133 (190° C., 2.16 kg load), and/or
   (b) is an ethylene copolymer.

10. The polyolefin composition (PO) according to claim 1 provided in an article.

11. The polyolefin composition according to claim 10, wherein the article is an automotive article.

12. The polyolefin composition (PO) according to claim 11, wherein the automotive article is a bumper.

* * * * *